(12) United States Patent
Minami et al.

(10) Patent No.: US 10,218,086 B2
(45) Date of Patent: Feb. 26, 2019

(54) ARRAY ANTENNA DEVICE

(71) Applicant: TOYOTA JIDOSHA KABUSHIKI KAISHA, Toyota-shi, Aichi (JP)

(72) Inventors: Yoshiaki Minami, Gotenba (JP); Yuji Oda, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 290 days.

(21) Appl. No.: 15/309,867

(22) PCT Filed: Sep. 24, 2014

(86) PCT No.: PCT/JP2014/075314
§ 371 (c)(1),
(2) Date: Nov. 9, 2016

(87) PCT Pub. No.: WO2015/182002
PCT Pub. Date: Dec. 3, 2015

(65) Prior Publication Data
US 2017/0149147 A1    May 25, 2017

(30) Foreign Application Priority Data
May 29, 2014  (JP) .................. 2014-111772

(51) Int. Cl.
*H01Q 21/29* (2006.01)
*H01Q 21/08* (2006.01)
(Continued)

(52) U.S. Cl.
CPC ............. *H01Q 21/29* (2013.01); *H01Q 21/06* (2013.01); *H01Q 21/08* (2013.01); *H01Q 25/00* (2013.01)

(58) Field of Classification Search
CPC ........ H01Q 21/29; H01Q 21/06; H01Q 21/08; H01Q 25/00; H01Q 3/2629; H01Q 3/2635; G01S 7/2813; G01S 7/36
(Continued)

(56) References Cited

U.S. PATENT DOCUMENTS 9,310,478 B2    4/2016  Gross et al.
2010/0232529 A1*  9/2010  Fettweis ................ H01Q 1/246
                                                                  375/260
(Continued)

FOREIGN PATENT DOCUMENTS

JP    2012-120144 A    6/2012
JP    2013-504764 A    2/2013

OTHER PUBLICATIONS

International Search Report of PCT/JP2014/075314 dated Dec. 16, 2014 [PCT/ISA/210].

*Primary Examiner* — Harry K Liu
(74) *Attorney, Agent, or Firm* — Sughrue Mion, PLLC

(57) ABSTRACT

An array antenna device includes a plurality of antenna elements arranged to include a first antenna element arrangement in which antenna elements are arranged at element intervals having predetermined periodicity and a second antenna element arrangement in which antenna elements are arranged at element intervals having predetermined periodicity different from the periodicity in the first antenna element arrangement. The array antenna device includes a control unit configured to remove erroneous detection caused by a grating lobe based on a comparison of a detection result by an array antenna of the first antenna element arrangement and a detection result by an array antenna of the second antenna element arrangement.

3 Claims, 11 Drawing Sheets

(51) Int. Cl.
*H01Q 21/06* (2006.01)
*H01Q 25/00* (2006.01)

(58) Field of Classification Search
USPC .......................................................... 342/379
See application file for complete search history.

(56) References Cited

U.S. PATENT DOCUMENTS

| | | | | |
|---|---|---|---|---|
| 2011/0273326 | A1* | 11/2011 | Shirakawa | G01S 7/40 342/25 R |
| 2012/0229366 | A1* | 9/2012 | Ding | H01Q 9/0414 343/907 |
| 2014/0145896 | A1* | 5/2014 | Bi | H01Q 25/04 343/844 |
| 2016/0013557 | A1* | 1/2016 | Kawaguchi | H01Q 1/38 343/905 |

* cited by examiner

FIG.10
[FIRST EXAMPLE: WHEN K1 = 3 AND K2 = 4]
INTERVAL:
D * 4
INTERVAL:
D * 3
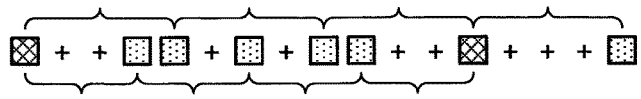
[SECOND EXAMPLE: WHEN K1 = 3 AND K2 = 5]
INTERVAL:
D * 5
INTERVAL:
D * 3
[THIRD EXAMPLE: WHEN K1 = 4 AND K2 = 5]
INTERVAL:
D * 5
INTERVAL:
D * 4
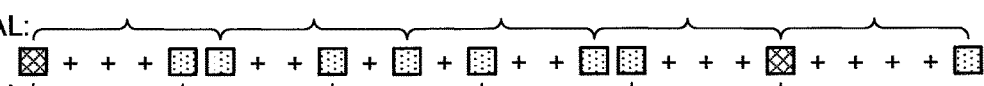
FIG.11
[FIRST EXAMPLE: WHEN K1 = 3 AND K2 = 4]
INTERVAL: D * 2
INTERVAL: D * 4
INTERVAL: D * 3
INTERVAL: D * 1
INTERVAL: D * 5
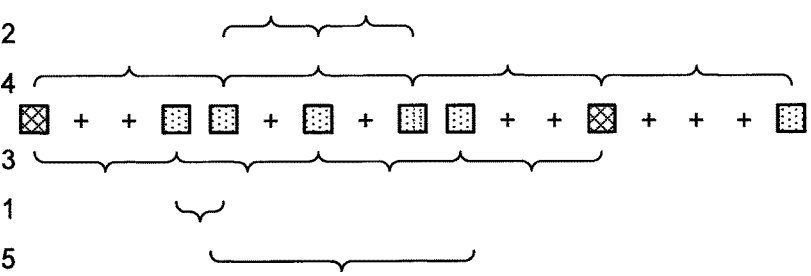

ARRAY ANTENNA DEVICE

CROSS REFERENCE TO RELATED APPLICATIONS

This application is a National Stage of International Application No. PCT/JP2014/075314, filed Sep. 24, 2014, claiming priority based on Japanese Patent Application No. 2014-111772, filed May 29, 2014, the contents of all of which are incorporated herein by reference in their entirety.

FIELD

The present invention relates to an array antenna device.

BACKGROUND

In an array antenna that electronically scans a main lobe in an angle range of $-\alpha$ to $\alpha$ and performs target detection, when an element-antenna distance is indicated by d, and a wavelength of transmission and reception radio waves is indicated by $\lambda$, there are cases in which a grating lobe appears in a scanning range ($-\alpha$ to $\alpha$) of the main lobe when $d > 0.5\lambda/\sin \alpha$.

When the grating lobe appears in the scanning range of the main lobe, a direction of the target is likely to be erroneously detected. For this reason, it is desirable to prevent the grating lobe from appearing in the scanning range of the main lobe.

Here, when the element-antenna distance d is reduced to be sufficiently smaller than the wavelength $\lambda$, it is possible to prevent the grating lobe from appearing in the scanning range of the main lobe regardless of a directional angle of the main lobe. However, the wavelength $\lambda$ and the element-antenna distance d are restricted by various conditions, and it is difficult to set the wavelength $\lambda$ and the element-antenna distance d beyond an upper limit or a lower limit of the conditions.

In this regard, a technique of removing erroneous detection caused by the grating lobe has been developed in the past.

For example, in an array antenna device disclosed in Patent Literature 1, a transmission array antenna and a reception array antenna each of which is configured such that a plurality of element antennas are arranged on a straight line at equal intervals are provided. When M and N are relatively prime integers, the element antennas of the reception array antenna are arranged near a first null occurrence angle in an array element pattern of the element antennas with a quotient obtained by multiplying the integer M by the wavelength and dividing by the first null occurrence angle so as to have an M-th grating lobe of an array factor of the reception array antenna, and the element antennas of the transmission array antenna are arranged at intervals of a quotient obtained by multiplying the integer N by the interval of the element antennas of the reception array antenna and then dividing by the integer M so that an occurrence angle of an N-th grating lobe of an array factor of the transmission array antenna is identical to an occurrence angle of the M-th grating lobe.

As described above, in the technique disclosed in Patent Literature 1, the grating lobe is suppressed by taking a product of directivity patterns of two types of array antenna element arrangements. However, since it is difficult to suppress all the grating lobes in the angle range of beam scanning only through this, the remaining grating lobes are suppressed by causing the occurrence angle of the grating lobe to be identical to an angle at which a null point at which an antenna gain is noticeably low in antenna element directivity (an element factor) is formed.

CITATION LIST

Patent Literature

Patent Literature 1: Japanese Laid-open Patent Publication No. 2012-120144

SUMMARY

Technical Problem

However, in the technique (Patent Literature 1 or the like) of suppressing the grating lobe according to the related art, since it is not on the assumption that beam scanning is performed, when beam scanning is performed, the angle at which the grating lobe occurs changes accordingly. In this case, the grating lobe occurrence angle is not identical to the null point forming angle. As a result, there are cases in which it is difficult to suppress all the grating lobes in a desired detection angle range.

The present invention was made in light of the foregoing, and it is an object of the present invention to provide an array antenna device which is capable of removing erroneous detection caused by the grating lobe when beam scanning is performed in an array antenna.

Solution to Problem

An array antenna device according to the present invention includes a plurality of antenna elements arranged to include a first antenna element arrangement in which the antenna elements are arranged at element intervals having predetermined periodicity and a second antenna element arrangement in which the antenna elements are arranged at element intervals having predetermined periodicity different from the periodicity in the first antenna element arrangement. The array antenna device includes: a control unit configured to remove erroneous detection caused by a grating lobe based on a comparison of a detection result by an array antenna of the first antenna element arrangement and a detection result by an array antenna of the second antenna element arrangement. A first element interval serving as an antenna element interval of the first antenna element arrangement and a second element interval serving as an antenna element interval of the second antenna element arrangement are intervals of an integral multiple of a minimum antenna element interval set as an antenna element interval satisfying Formula 1:

$$0 < D < (0.5\lambda/\sin \alpha) \quad \text{(Formula 1)}$$

(in Formula 1, D indicates the minimum antenna element interval, $\alpha$ indicates a predetermined maximum detection angle, and $\lambda$ indicates a wavelength of a radio wave). A first integer serving as an integer used for setting the first element interval to be the integral multiple of the minimum antenna element interval and a second integer serving as an integer used for setting the second element interval to be the integral multiple of the minimum antenna element interval are satisfied to be positive integers of 2 or larger having a relatively prime relation.

In the above-described array antenna device, it is preferable that the antenna elements corresponding to the first antenna element arrangement and the antenna elements corresponding to the second antenna element arrangement are arranged such that an array antenna of the first antenna element arrangement and an array antenna of the second antenna element arrangement are arranged in parallel.

In the above-described array antenna device, it is preferable that the antenna elements corresponding to the first antenna element arrangement and the antenna elements corresponding to the second antenna element arrangement are arranged such that the first antenna element arrangement and the second antenna element arrangement are combined and arranged on a straight line in series in a state in which a position of at least one of the antenna elements of the first antenna element arrangement overlaps with a position of at least one of the antenna elements of the second antenna element arrangement.

Advantageous Effects of Invention

According to the array antenna device of the present invention, an effect in that erroneous detection caused by the grating lobe can be removed when beam scanning is performed in an array antenna is obtained.

BRIEF DESCRIPTION OF DRAWINGS

FIG. 10 is a diagram illustrating an example of an arrangement of antenna elements according to the third embodiment.

FIG. 11 is a diagram illustrating an example of selectable antenna element intervals according to the third embodiment.

DESCRIPTION OF EMBODIMENTS

Hereinafter, exemplary embodiments of an array antenna device serving as a radar device equipped with an array antenna having an arrangement structure of an array antenna according to the present invention will be described in detail with reference to the appended drawings. The invention is not limited to the following embodiments. Further, components that can be easily derived by those having skill in the art or are substantially the same are included in components in the following embodiments.

First Embodiment

Figure 1:
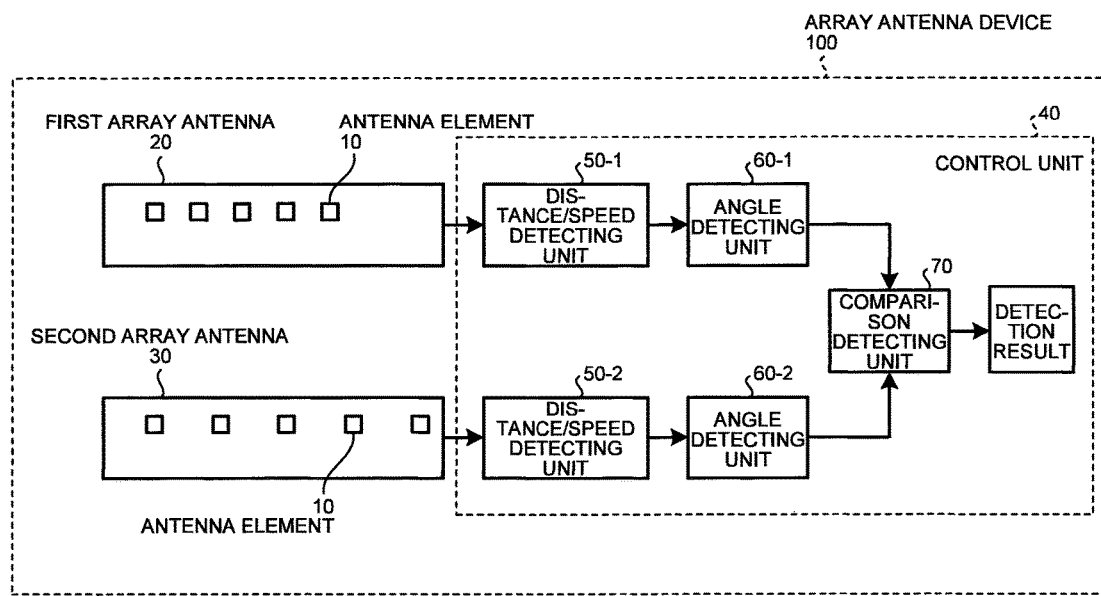
FIG. 1 is a diagram illustrating an example of a configuration of an array antenna device according to a first embodiment.
Figure 2:
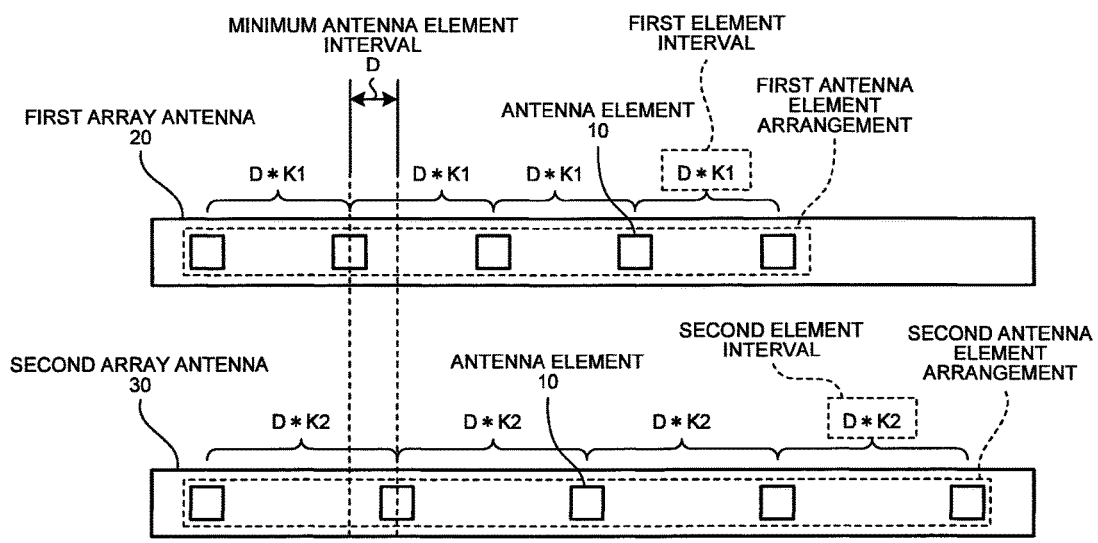
FIG. 2 is a diagram illustrating an example of an array antenna according to the first embodiment.
Figure 3:
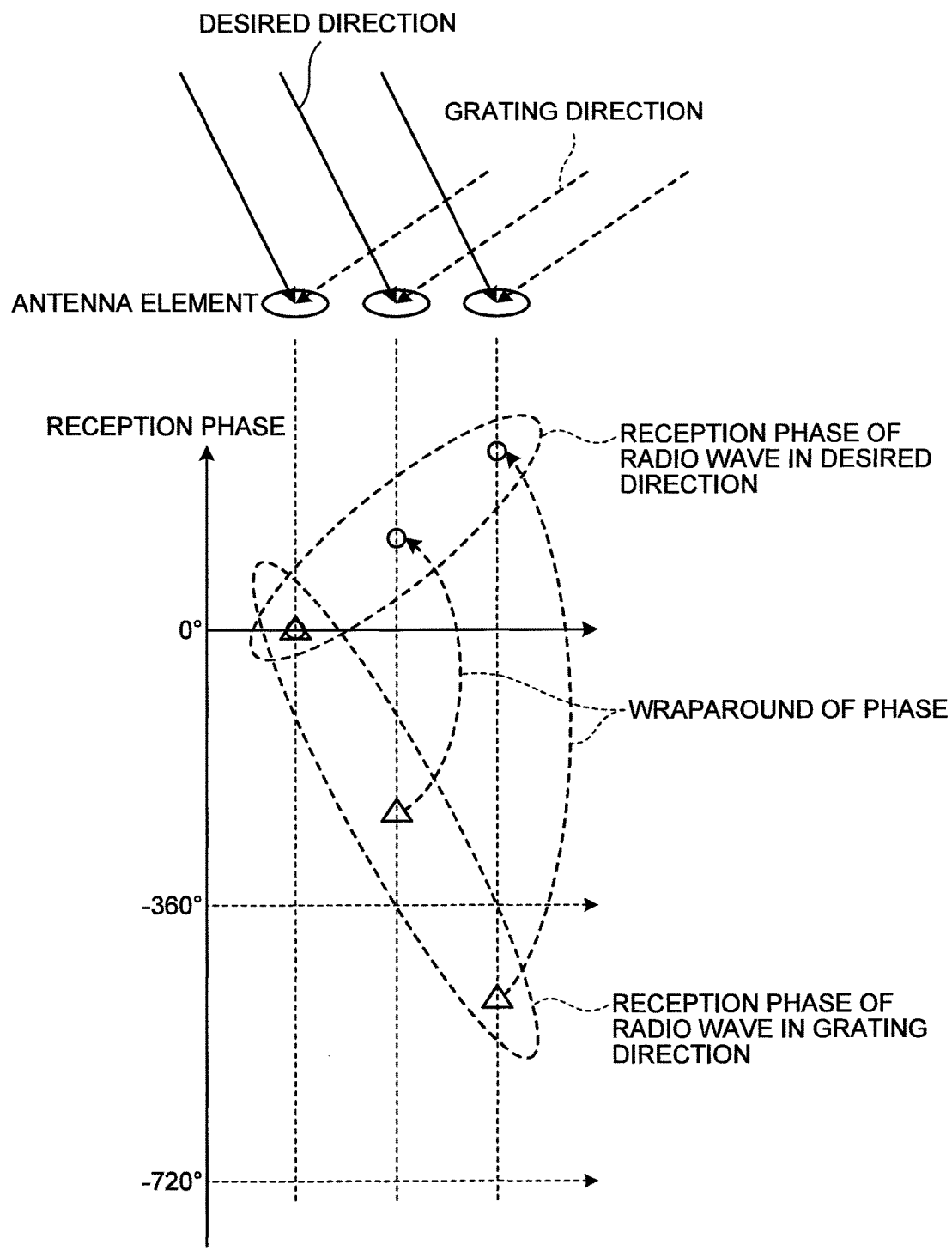
FIG. 3 is a diagram illustrating an example of a phase relation of reception waves.
Figure 4:
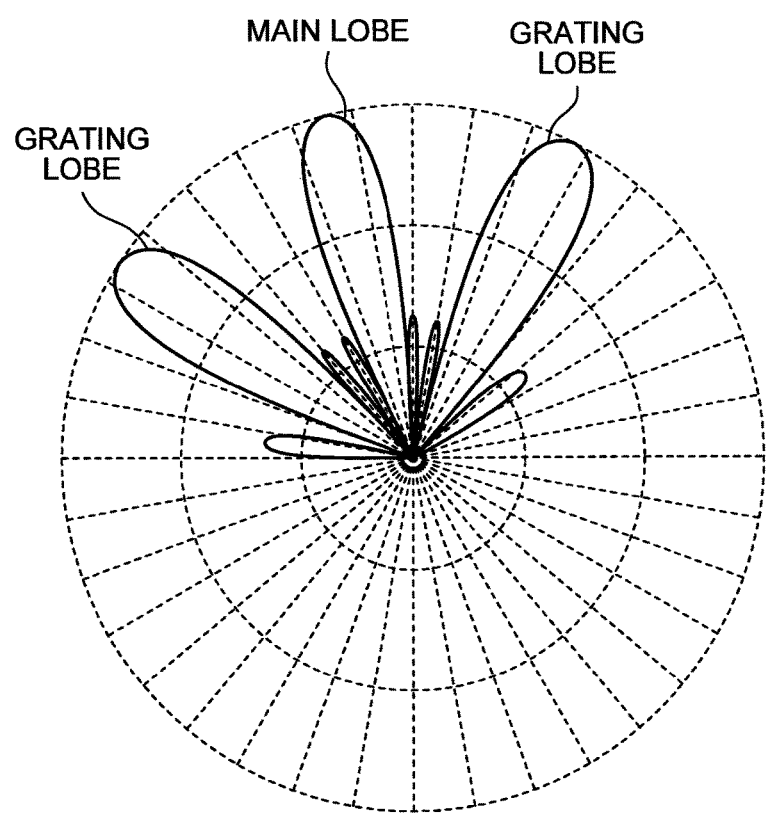
FIG. 4 is a diagram illustrating an example of array antenna directivity.
Figure 5:
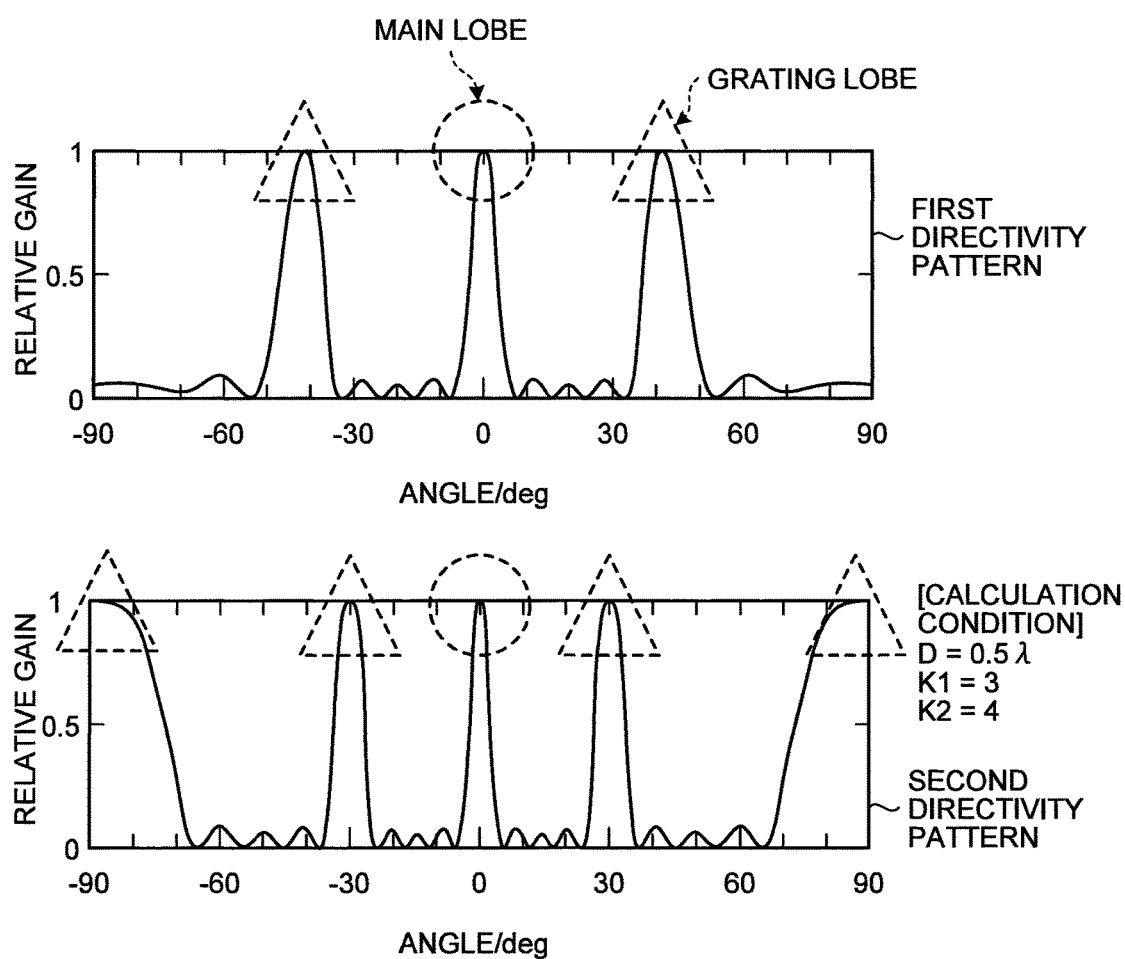
FIG. 5 is a diagram illustrating an example of a directivity pattern according to the first embodiment.
Figure 6:
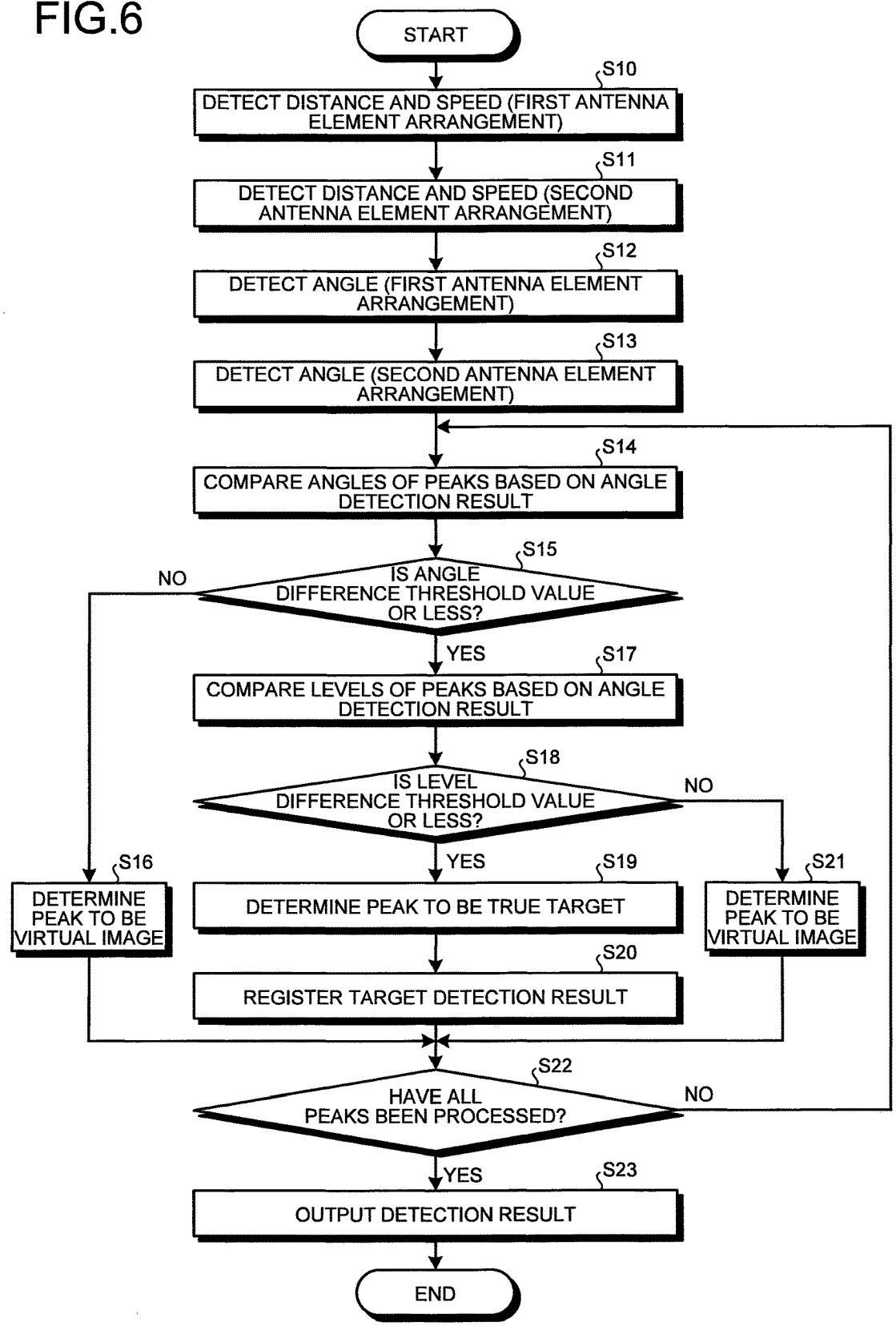
FIG. 6 is a flowchart illustrating an example of a process according to the first embodiment.

A first embodiment will be described with reference to FIGS. 1 to 6. FIG. 1 is a diagram illustrating an example of a configuration of an array antenna device 100 according to the first embodiment. FIG. 2 is a diagram illustrating an example of an array antenna according to the first embodiment. FIG. 3 is a diagram illustrating an example of a phase relation of reception waves. FIG. 4 is a diagram illustrating an example (a polar coordinate expression) of array antenna directivity. FIG. 5 is a diagram illustrating an example of directivity patterns according to the first embodiment. FIG. 6 is a flowchart illustrating an example of a process according to the first embodiment.

The array antenna device 100 according to the first embodiment includes a first array antenna 20, a second array antenna 30, and a control unit 40 as illustrated in FIG. 1.

Here, the first array antenna 20 and the second array antenna 30 will be described with reference to FIG. 2.

As illustrated in FIG. 2, the first array antenna 20 is an array antenna including antenna elements 10 that are arranged on a straight line with intervals of K1 times of a minimum antenna element interval D. The second array antenna 30 is an array antenna including antenna elements 10 that are arranged on a straight line with intervals of K2 times of the minimum antenna element interval D. K1 and K2 are positive integers of 2 or larger have a relatively prime relation.

Here, the "positive integers of 2 or larger have a relatively prime relation" indicate positive integers of 2 or larger excluding 1 among positive integers having a "relatively prime relation" which is a relation between two numbers when two integers have no common divisor except 1 and −1. The present embodiment, the positive integers of 2 or larger have a relatively prime relation are also referred to as "relatively prime positive integers of 2 or larger. Here, it is desirable that the relatively prime positive integers of 2 or larger be 3 or larger.

In the present embodiment, the "minimum antenna element interval" is an antenna element interval set to cause the grating lobe not to appear in a predetermined detection angle range when beam scanning is performed. For example, when a predetermined detection angle range is $\pm\alpha°$, it is necessary to set the minimum antenna element interval D in a range indicated by the following Formula 1. For example, when "$\alpha=90°$," it is necessary to set a value smaller than $0.5\lambda$ as the antenna element interval. $\lambda$ indicates a wavelength of transmission and reception radio waves.

$$0 < D < (0.5\lambda/\sin\alpha) \quad \text{(Formula 1)}$$

Here, the reason why the minimum antenna element interval D is set in the range indicated by Formula 1 will be described with reference to FIGS. 3 and 4 in addition to FIG. 2.

As illustrated in FIG. 3, when the antenna element interval of the array antenna is relatively large, there are cases in which there is another arrival direction that is the same in a phase relation when a radio wave arrived in a desired direction is received due to phase circularity (an event in which 360° returns to 0°). Here, a desired direction is a direction in which there is a target, and another arrival direction is a grating direction. In this case, a lobe equivalent to the main lobe in the desired direction in which there is a target occurs in the grating direction as illustrated in FIG. 4. This lobe is the grating lobe.

If the grating lobe occurs in a radar antenna, it cannot be determined that whether a received signal arrives in the desired direction or the grating direction. Accordingly, the direction of the target is likely to be erroneously detected. In order to prevent the grating lobe from occurring in the scanning range (−α to α) of the main lobe, it is necessary to set the antenna element interval to be less than 0.5λ/sin α as indicated in Formula 1.

In this regard, as illustrated in FIG. 2, in the array antenna according to the present embodiment, the minimum antenna element interval D satisfying Formula 1 is set, and the antenna elements are arranged at intervals of the respective two different positive integers (K1 and K2) times of the minimum antenna element interval D. Here, the two positive integers (K1 and K2) are relatively prime positive integers of 2 or larger.

As described above, the array antenna according to the present embodiment has an arrangement structure of array antennas arranged to include two types of array antenna element arrangements as illustrated in FIG. 2. The antenna element intervals of the two types of array antenna element arrangements are integral multiples (D×K1 and D×K2) of the minimum antenna element interval serving as the antenna element interval set so that the grating lobe does not occur in a predetermined detection angle range, and the respective integers are relatively prime positive integers of 2 or larger.

Specifically, the array antenna according to the present embodiment includes the first array antenna 20 and the second array antenna 30 configured to include the two types of array antenna element arrangements as illustrated in FIG. 2. The first array antenna 20 is an array antenna including a plurality of antenna elements 10 arranged at element intervals having predetermined periodicity (the antenna element intervals of D×K1 in FIG. 2). The second array antenna 30 is an array antenna including a plurality of antenna elements 10 arranged at element intervals having predetermined periodicity different from the periodicity in the first antenna element arrangement (the antenna element intervals of D×K2 in FIG. 2).

Here, both the first element interval serving as the antenna element interval of the first antenna element arrangement (the antenna element interval of D×K1 in FIG. 2) and the second element interval serving as the antenna element interval of the second antenna element arrangement (the antenna element interval of D×K2 in FIG. 2) are intervals of integral multiples (K1 and K2) of the minimum antenna element interval D set as the antenna element interval satisfying Formula 1. The first integer K1 serving as an integer used for setting the first element interval to be an integral multiple of the minimum antenna element interval and the second integer K2 serving as an integer used for setting the second element interval to be an integral multiple of the minimum antenna element interval are satisfied to be positive integers of 2 or larger having a relatively prime relation. Thus, both the first element interval and the second element interval can be an interval of 0.5 or more times of the wavelength λ of the radio wave. Accordingly, in the array antenna according to the present embodiment, it is possible to remove the erroneous detection caused by the grating lobe while arranging the antenna elements at wide intervals. As a result, according to the array antenna device of the present embodiment, the erroneous detection caused by the grating lobe can be removed in a predetermined detection angle range (−α to α) (a beam scanning range). In other words, it is possible to compare detection results by the array antennas of the two types of element arrangements and determine a detection peak by the grating lobe in the beam scanning range. As described above, the erroneous detection caused by the grating lobe can be removed when the beam scanning is performed in the array antenna.

Referring back to FIG. 1, the description of the configuration of the array antenna device 100 according to the first embodiment is continued.

In FIG. 1, the control unit 40 is a control unit that removes the erroneous detection caused by the grating lobe based on a comparison of the detection result by the array antenna of the first antenna element arrangement and the detection result by the array antenna of the second antenna element arrangement. The detection result by the array antenna of the first antenna element arrangement and the detection result by the array antenna of the second antenna element arrangement are detection results of an angle of the target based on signals received by the two types of array antenna element arrangements which are detected through angle detecting units 60-1 to 60-2 which will be described later. Here, the control unit 40 includes distance/speed detecting units 50-1 to 50-2, the angle detecting units 60-1 to 60-2, and a comparison detecting unit 70. The respective processing units of the control unit 40 will be described below.

In the control unit 40, each of the distance/speed detecting units 50-1 and 50-2 is a distance/speed detecting unit that detects a distance and a speed of the target based on signals received through the antenna elements 10 of the first array antenna 20 and the second array antenna 30. In the present embodiment, each of the distance/speed detecting units 50-1 and 50-2 detects the distance and the speed of the target for each antenna element through a distance/speed detection technique used in a corresponding technical field. The distance/speed detecting units 50-1 to 50-2 output the detection results of the distance and the speed of the target to the angle detecting units 60-1 to 60-2.

In the control unit 40, the angle detecting units 60-1 to 60-2 is angle detecting units that detect the angle of the target using the detection results of the distance/speed detecting units 50-1 and 50-2. The detection result includes the detection result by the grating lobe in addition to the detection result by the main lobe. In the present embodiment, each of the angle detecting units 60-1 to 60-2 detects the angle of the target through an angle detection technique used in a corresponding technical field. Each of the angle detecting units 60-1 to 60-2 outputs the detection result of the angle of the target to the comparison detecting unit 70.

Here, an example of the detection results by the two types of array antenna element arrangements will be described with reference to FIGS. 2 and 5.

In the first embodiment, two types of array antennas that differ in the antenna element interval are arranged in parallel as illustrated in FIG. 2. In the first embodiment, the antenna elements 10 corresponding to the first antenna element arrangement and the antenna elements 10 corresponding to the second antenna element arrangement are arranged such that the array antenna of the first antenna element arrangement and the array antenna of the second antenna element arrangement are arranged in parallel. As an example, as illustrated in FIG. 2, the antenna elements 10 corresponding to the first antenna element arrangement and the antenna elements 10 corresponding to the second antenna element arrangement may be arranged such that the array antenna of the first antenna element arrangement and the array antenna of the second antenna element arrangement are arranged in parallel in a state in which the position of the antenna element 10 corresponding to one end of the first antenna element arrangement is aligned with the position of the antenna element 10 corresponding to one end of the second antenna element arrangement.

As the two types of array antenna element arrangements (the first antenna element arrangement and the second antenna element arrangement in FIG. 2) are provided, the directivity patterns in the two types of array antenna element arrangements that differ in the antenna element interval (the first array antenna 20 and the second array antenna 30 FIG. 2) are a first directivity pattern illustrated in an upper part of FIG. 5 and a second directivity pattern illustrated in a lower part of FIG. 5.

In FIG. 5, a calculation condition is D=0.5λ, K1=3, and K2=4. The upper diagram of FIG. 5 illustrates the directivity pattern of the first array antenna 20 in which the antenna elements 10 are arranged at intervals of K1 times of the minimum antenna element interval D as the first directivity pattern. In the upper diagram of FIG. 5, the grating lobe occurs near +42° and −42°. The lower diagram of FIG. 5 illustrates an example of the directivity pattern of the second array antenna 30 in which the antenna elements 10 are arranged at intervals of K2 times of the minimum antenna element interval D as the second directivity pattern. In the lower diagram of FIG. 5, illustrated is the directivity pattern when the main lobe is directed in a 0° direction, and the grating lobe occurs near +30° and −30° and near +90° and −90°.

As illustrated in FIG. 5, when the beam scanning is performed through the main lobe in a predetermined detection angle range, the positions of the grating lobes occurring in the detection angle range in the first directivity pattern and the second directivity pattern do not overlap. As illustrated in FIG. 5, since the positions of the grating lobes occurring in a predetermined detection angle range do not overlap, the comparison detecting unit 70 which will be described later can compare the detection results by the two types of array antenna element arrangements, determine a ghost (a virtual image) caused by the grating lobe, and remove the ghost (the virtual image). In the present embodiment, the ghost indicates the virtual image of the target which is obtained as a result of detecting the target through the grating lobe rather than the main lobe and does not actually exist at the angle.

Referring back to FIG. 1, in the control unit 40, the comparison detecting unit 70 is a comparison detecting unit that compares the detection results by the two types of array antennas. When the detection results are detected by the main lobe, the angels of the detection peaks are equal to each other, and a level difference is small. On the other hand, when the detection results are detected by the grating lobe, the angels detected by the two types of array antennas are different, and there is a level difference when the detection results are compared at the same angle. The comparison detecting unit 70 detects the difference and removes the difference as the ghost caused by the grating lobe. Then, the comparison detecting unit 70 outputs the remaining result as the detection result. For example, the comparison detecting unit 70 compares the detection result by the first array antenna 20 and the detection result by the second array antenna 30 illustrated in FIG. 5, removes a peak in which the angle difference or the level difference is larger than a predetermined threshold value, and outputs only the detection result by the main lobe. More specifically, for example, the comparison detecting unit 70 compares the detection result by the first array antenna 20 and the detection result by the second array antenna 30 illustrated in FIG. 5, specifies a predetermined peak in one directivity pattern for a predetermined reference peak selected as a peak serving as a reference in another directivity pattern, and removes the reference peak when the angle difference or the level difference between the peaks is larger than a predetermined threshold value.

An example of a detection result output process performed by the array antenna device 100 having the above-described configuration according to the first embodiment will be described with reference to FIG. 6.

In FIG. 6, the first antenna element arrangement is a group of antenna elements 10 arranged on the straight line at the intervals of K1 times of the minimum antenna element interval D in the first array antenna 20. The second antenna element arrangement is a group of antenna elements 10 arranged on the straight line at the intervals of K2 times of the minimum antenna element interval D in the second array antenna 30.

As illustrated in FIG. 6, in the first antenna element arrangement, the distance/speed detecting unit 50-1 detects the distance and the speed of the target based on the signals received through the antenna elements 10 of the first array antenna 20 (step S10). Similarly, in the second antenna element arrangement, the distance/speed detecting unit 50-2 detects the distance and the speed of the target based on the signals received through the antenna elements 10 of the second array antenna 30 (step S11).

In the first antenna element arrangement, the angle detecting unit 60-1 detects the angle of the target using the detection result detected by the distance/speed detecting unit 50-1 in step S10 (step S12). Similarly, in the second antenna element arrangement, the angle detecting unit 60-2 detects the angle of the target using the detection result detected by the distance/speed detecting unit 50-2 in step S11 (step S13). The detection results in steps S10 to S13 include the detection result by the grating lobe in addition to the detection result by the main lobe as well.

The comparison detecting unit 70 compares the angles of the peaks in the angle detection results based on the angle detection result of the first antenna element arrangement detected by the angle detecting unit 60-1 in step S12 and the angle detection result of the second antenna element arrangement detected by the angle detecting unit 60-2 in step S13 (step S14).

The comparison detecting unit 70 determines whether or not the angle difference of the peaks is a threshold value or less (angle difference≤threshold value) based on a comparison result related to the angles of the peaks obtained in the process of step S14 (step S15).

In step S15, the comparison detecting unit 70 specifies the peak of the detection angle in the detection result by the second array antenna which is closest to the reference peak in the detection result by the first array antenna, and determines the reference peak to be the virtual image (step S16) when the angle difference of the peaks is determined to be larger than a threshold value (angle difference>threshold value) (step S15: No). In other words, in step S16, when the difference between the angles at which the peak appears in the detection results of the first array antenna and the second array antenna is larger than a threshold value, the comparison detecting unit 70 determines the peak to be the detection result by the grating lobe. When the target exists only in the 0° direction, an angle characteristic of the detection result is similar to the directivity pattern, and thus the description will proceed under the assumption that the directivity pattern of FIG. 5 is the detection result. When the upper diagram and the lower diagram of FIG. 5 are compared, the angle difference between the reference peak detected near −90° in the lower diagram and the peak detected near −42° in the upper diagram is about 48°, and the angle difference is determined to be larger than a threshold value. In this case, the peak detected near −90° in the lower diagram is determined to be the detection result by the grating lobe.

When the peak is determined to be the virtual image in step S16, the comparison detecting unit 70 removes the peak determined to be the virtual image without registering the peak as the detection result, and then determines whether or not all peaks have been processed in order to process each peak (step S22). In step S22, the comparison detecting unit 70 determines whether or not all peaks of the first detection result and the second detection result have been processed.

Here, when it is determined that there is any one peak that has not been processed in step S22 (No in step S22), the comparison detecting unit 70 causes the process to return to step S14, and the process of steps S14 to S21 performed by the comparison detecting unit 70 is repeated for each peak.

The process returns to step S14, and the description of the process according to the first embodiment is continued. The comparison detecting unit 70 compares angels of other peaks that do not undergo the process of steps S14 to S21 based on the detection results by the first array antenna and the second array antenna which are detected through the angle detecting units 60-1 to 60-2 in step S12 and step S13 (step S14). Then, the comparison detecting unit 70 determines whether or not the angle difference of the peaks is a threshold value or less (angle difference≤threshold value) based on a result of comparing the angels of the peaks obtained in the process of step S14 (step S15).

Then, the comparison detecting unit 70 specifies the peak of the detection angle in one detection result which is closest to the reference peak in another detection result in step S15, and compares levels of the peaks when the angle difference of the peaks is determined to be a threshold value or less (angle difference≤threshold value) (Yes in step S15) (step S17). Then, the comparison detecting unit 70 determines whether or not the level difference of the peaks is a threshold value or less (level difference≤threshold value) based on a result of comparing the levels of the peaks obtained in the process of step S17 (step S18).

In the present embodiment, when the angle difference of the peaks is determined to be a threshold value or less (the angle difference≤threshold value) in step S15, the comparison detecting unit 70 compares the levels of the peaks in step S17. In other words, in step S17, the comparison detecting unit 70 determines that the peak is likely to be the detection result by the main lobe when the difference of the angles at which the peak appears in the detection results by the first array antenna and the second array antenna is a threshold value or less. Here, when the angle difference between the peaks to be compared is small, but the level difference between the peaks is large, the peak is likely to be the detection result by the grating lobe rather than the main lobe. In this case, when the level difference of the peaks as well as the angle difference is a threshold value or less, the peak can be determined to be the detection result by the main lobe. In this regard, in step S18, for the peak determined to be likely to be the detection result by the main lobe since the angle difference of the peaks is a threshold value or less, the comparison detecting unit 70 further determines whether or not the level difference between the peaks is a threshold value or less (level difference≤threshold value) or larger than a threshold value (level difference>threshold value).

The comparison detecting unit 70 specifies the peak of the detection angle in one detection result which is closest to the reference peak in another detection result in step S18, and determines the reference peak to be the true target when the level difference between the peaks is determined to be a threshold value or less (level difference≤threshold value) (Yes in step S18) (step S19). In other words, in step S19, the comparison detecting unit 70 determines the peak to be the detection result by the main lobe when the difference between the angles at which the peak appears in the angle detection results of the first array antenna and the second array antenna is a threshold value or less, and the level difference between the peaks is a threshold value or less. When the upper diagram and the lower diagram of FIG. 5 are compared under the assumption that the directivity pattern of FIG. 5 is the detection result when the target exists only in the 0° direction, there is not angle difference between the peak serving as the reference detected near 0° in the lower diagram and the peak detected near 0° in the upper diagram, and thus the angle difference is determined to be a threshold value or less. In this case, the peak detected near 0° in the lower diagram is determined to be highly likely to be the detection result by the main lobe. Further, the level of the peak detected near 0° in the upper diagram is 1, and the level of the peak detected near 0° in the lower diagram is also 1, and thus there is no level difference, the level difference is determined to be a threshold value or less. Thus, when it is determined that the angle difference is a threshold value or less, and the level difference is a threshold value or less in step S19, the comparison detecting unit 70 determines that the peak detected near 0° in the lower diagram is the detection result by the main lobe which is detected in a desired direction in which the target exists rather than the detection result by the grating lobe.

The comparison detecting unit 70 registers the detection result of the target determined to be the detection result by the main lobe in step S19 (step S20).

The comparison detecting unit 70 determines whether or not all peaks have been processed (step S22). In step S22, the comparison detecting unit 70 determines whether or not all peaks of the first detection result and the second detection result have been processed. Here, when it is determined that there is any one peak that has not been processed in step S22 (No in step S22), the comparison detecting unit 70 causes the process to return to step S14, and the process of steps S14 to S21 performed by the comparison detecting unit 70 is repeated for each peak.

The process returns to step S14 again, and the description of the process according to the first embodiment is continued. The comparison detecting unit 70 compares angels of other peaks that do not undergo the process of steps S14 to S21 based on the detection results by the first array antenna and the second array antenna which are detected through the angle detecting units 60-1 to 60-2 in step S12 and step S13 (step S14). Then, the comparison detecting unit 70 determines whether or not the angle difference of the peaks is a threshold value or less (angle difference≤threshold value) based on a result of comparing the angels of the peaks obtained in the process of step S14 (step S15).

Then, the comparison detecting unit 70 specifies the peak of the detection angle in one detection result which is closest to the reference peak in another detection result in step S15, and compares levels of the peaks when the angle difference of the peaks is determined to be a threshold value or less (angle difference≤threshold value) (Yes in step S15) (step S17). Then, the comparison detecting unit 70 determines whether or not the level difference of the peaks is a threshold value or less (level difference≤threshold value) based on a result of comparing the levels of the peaks obtained in the process of step S17 (step S18).

The comparison detecting unit 70 specifies the peak of the detection angle in one detection result which is closest to the reference peak in another detection result in step S18, and determines the reference peak to be the virtual image when the level difference between the peaks is determined to be larger than a threshold value (level difference>threshold value) (No in step S18) (step S21). In other words, in step S21, the comparison detecting unit 70 determines the peak is to be the detection result by the grating lobe when the level difference is larger than a threshold value although the peak is likely to be the detection result by the main lobe since the difference of the angles at which the peak appears in the detection results by the first array antenna and the second array antenna is a threshold value or less.

When the peak is determined to be the virtual image in step S21, the comparison detecting unit 70 removes the peak determined to be the virtual image without registering the peak as the detection result, and then determines whether or not all peaks have been processed (step S22). In step S22, the comparison detecting unit 70 determines whether or not all peaks of the first detection result and the second detection result have been processed.

Then, when all peaks is determined to have been processed in step S22 as a result of repeatedly performing the process of steps S14 to S21 on all peaks (Yes in step S22), that is, when all peaks of the first detection result and the second detection result are determined to have been processed, the comparison detecting unit 70 outputs the detection result including the detection result by the main lobe in the state in which the detection result by the grating lobe is removed based on the detection result of the target registered in step S20 (step S23). Thereafter, the process illustrated in FIG. 6 ends.

As described above, according to the array antenna device 100 of the first embodiment, since the antenna elements can be arranged at wide intervals, it is possible to implement fine beams using a small number of elements and improve angular resolution. Further, it is possible to determine whether or not the result detected through each array antenna is obtained by the main lobe or the grating lobe and remove the ghost caused by the grating lobe, and thus it is possible to reduce the erroneous detection of the target. Therefore, according to the array antenna device 100 of the first embodiment, it is possible to excellently remove the erroneous detection caused by the grating lobe from the detection result in the array antenna.

Second Embodiment

Figure 7:
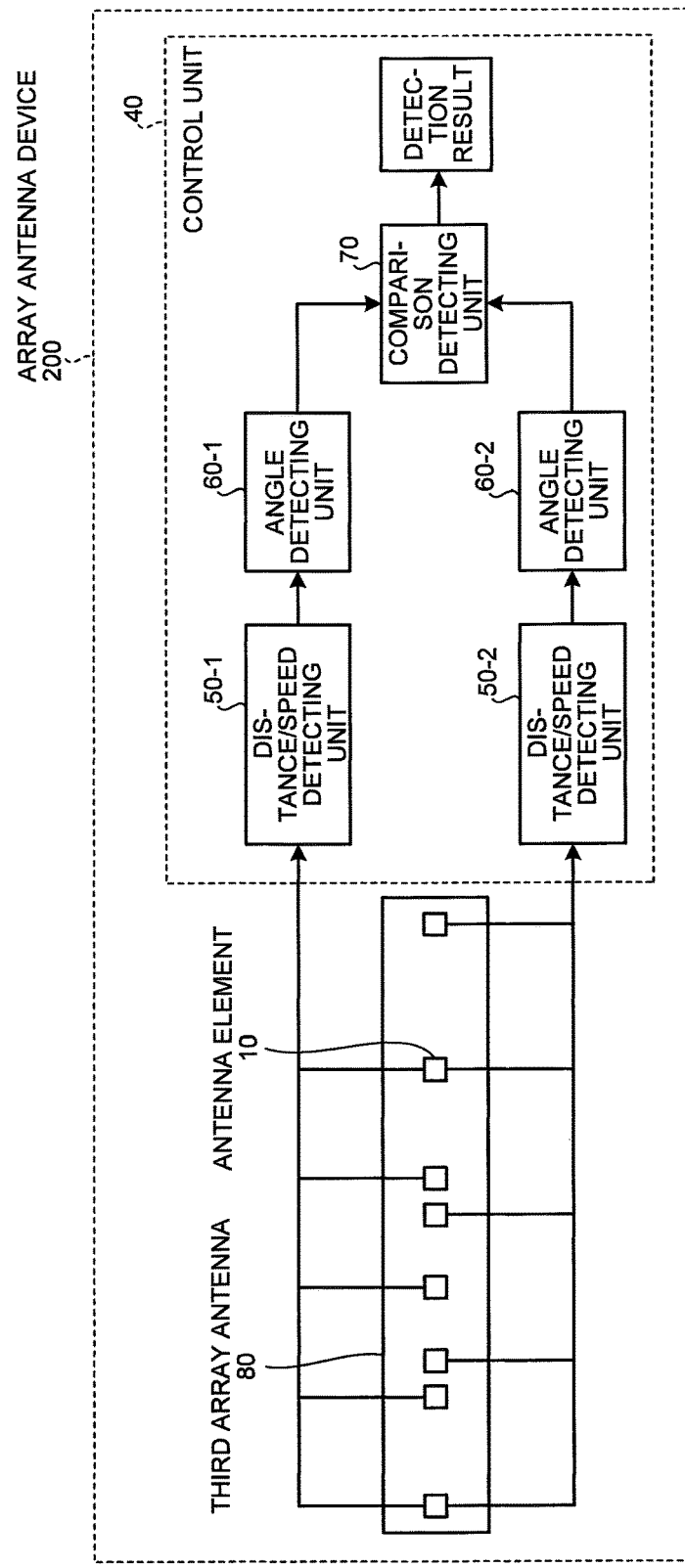
FIG. 7 is a diagram illustrating an example of a configuration of an array antenna device according to a second embodiment.
Figure 8:
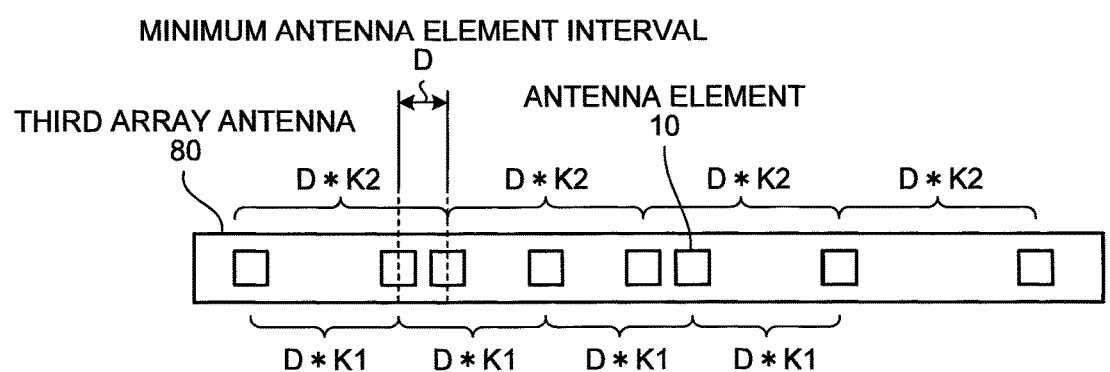
FIG. 8 is a diagram illustrating an example of an array antenna according to the second embodiment.

A second embodiment will be described with reference to FIGS. 7 and 8. FIG. 7 is a diagram illustrating an example of a configuration of an array antenna device according to the second embodiment. FIG. 8 is a diagram illustrating an example of an array antenna according to the second embodiment.

An array antenna device 200 according to the second embodiment includes a third array antenna 80 and a control unit 40 as illustrated in FIG. 7.

Here, the third array antenna 80 will be described with reference to FIG. 8.

The third array antenna 80 is an array antenna in which antenna elements 10 are arranged at positions of K1 times and K2 times of the minimum antenna element interval D, and the antenna elements 10 are arranged at a straight line using the antenna element 10 positioned at the left end of the third array antenna 80 as a common antenna element as illustrated in FIG. 8. K1 and K2 are relatively prime positive integers of 2 or larger.

In other words, the third array antenna 80 is an array antenna configured by combining the two array antennas, that is, the first array antenna 20 and the second array antenna 30 illustrated in FIG. 2. When the first antenna elements from the left of FIG. 2 in the first array antenna 20 and the second array antenna 30 are used as the common antenna element, the antenna elements are arranged at the positions of K1 times and K2 times of the minimum antenna element interval D as in the third array antenna 80 illustrated in FIG. 8.

As described above, in the second embodiment, the antenna elements corresponding to the two types of array antenna element arrangements are arranged such that the two types of array antenna element arrangements are combined and arranged on the straight line in series in a state in which the antenna elements of the two types of array antenna element arrangements overlap at least one position. Specifically, the antenna elements corresponding to the first antenna element arrangement and the second antenna element arrangement are arranged such that the first antenna element arrangement and the second antenna element arrangement are combined and arranged on the straight line in series in a state in which a position of at least one of the antenna elements of the first antenna element arrangement overlaps with a position of at least one of the antenna elements of the second antenna element arrangement.

In the third array antenna 80 configured to include the two types of array antenna element arrangements (the first antenna element arrangement and the second antenna element arrangement), since the number of array antennas is one, the size of the array antenna device 200 serving as the radar device can be reduced, and mountability in a vehicle can be improved. Further, by appropriately selecting K1 and K2 which are the relatively prime positive integers of 2 or larger, the two antenna elements 10 can be consecutively arranged at the minimum antenna element intervals D, and since a power supply unit can be installed in space at the left and right of the two antenna elements 10 that are consecutively arranged, the power supply unit can be installed even when the minimum antenna element interval D is small.

Referring back to FIG. 7, the description of the configuration of the array antenna device 200 of the second embodiment.

In FIG. 7, the control unit 40 includes distance/speed detecting units 50-1 to 50-2, angle detecting units 60-1 to 60-2, and a comparison detecting unit 70. The respective processing units of the control unit 40 will be described below.

In the control unit 40, each of the distance/speed detecting units 50-1 and 50-2 is a distance/speed detecting unit that detects a distance and a speed of the target based on signals received through the antenna elements 10 of the third array antenna 80. In the second embodiment, each of the distance/speed detecting units 50-1 and 50-2 selects signals of necessary antenna elements 10 among the antenna elements 10 of the third array antenna 80, and performs the detection process. Specifically, the distance/speed detecting unit 50-1 selects the signals of the antenna elements 10 arranged at the positions of K1 times of the minimum antenna element interval D among the antenna elements 10 of the third array antenna 80, and performs the detection process. The distance/speed detecting unit 50-2 selects the signals of the antenna elements 10 arranged at the positions K2 times of the minimum antenna element interval D among the antenna elements 10 of the third array antenna 80, and performs the detection process. Each of the distance/speed detecting units 50-1 and 50-2 outputs the distance and the speed of the detection result of the target to the angle detecting units 60-1 to 60-2.

In the control unit 40, the angle detecting units 60-1 to 60-2 is angle detecting units that detect the angle of the target using the detection results of the distance/speed detecting units 50-1 and 50-2. The detection result includes the detection result by the grating lobe in addition to the detection result by the main lobe. Each of the angle detecting units 60-1 to 60-2 outputs the detection result of the angle of the target to the comparison detecting unit 70.

The comparison detecting unit 70 is a comparison detecting unit that compares the angle detection results obtained from the antenna elements 10 arranged at the positions of K1 times of the minimum antenna element interval D and the antenna elements 10 arranged at the positions of K2 times of the minimum antenna element interval D among the antenna elements 10 of the third array antenna 80. Similarly to the first embodiment, the comparison detecting unit 70 detects a difference between the angle detection results, and regards the detection results as the ghost by the grating lobe when the difference is large, removes the detection results, and outputs the remaining result as the detection result.

An example of a detection result output process performed by the array antenna device 200 having the above-described configuration according to the second embodiment is similar to FIG. 6 illustrating the example of the process according to the first embodiment, and thus a description thereof is omitted. Here, in the second embodiment, as illustrated in FIG. 8, the first antenna element arrangement is a group of antenna elements 10 arranged on the straight line at the intervals of K1 times of the minimum antenna element interval D in the third array antenna 80. The second antenna element arrangement is a group of antenna elements 10 arranged on the straight line at the intervals of K2 times of the minimum antenna element interval D in the third array antenna 80.

The example in which the distance/speed detecting units 50-1 and 50-2 and the angle detecting units 60-1 to 60-2 are configured with two systems has been described as the array antenna device 200 of the second embodiment, but the present invention is not limited thereto. The array antenna device 200 of the second embodiment may have a configuration in which the distance/speed detecting units 50-1 and 50-2 and the angle detecting units 60-1 to 60-2 are collected in one system, only the signals of the necessary antenna elements are selected and processed, and the processing unit is omitted.

Third Embodiment

Figure 9:
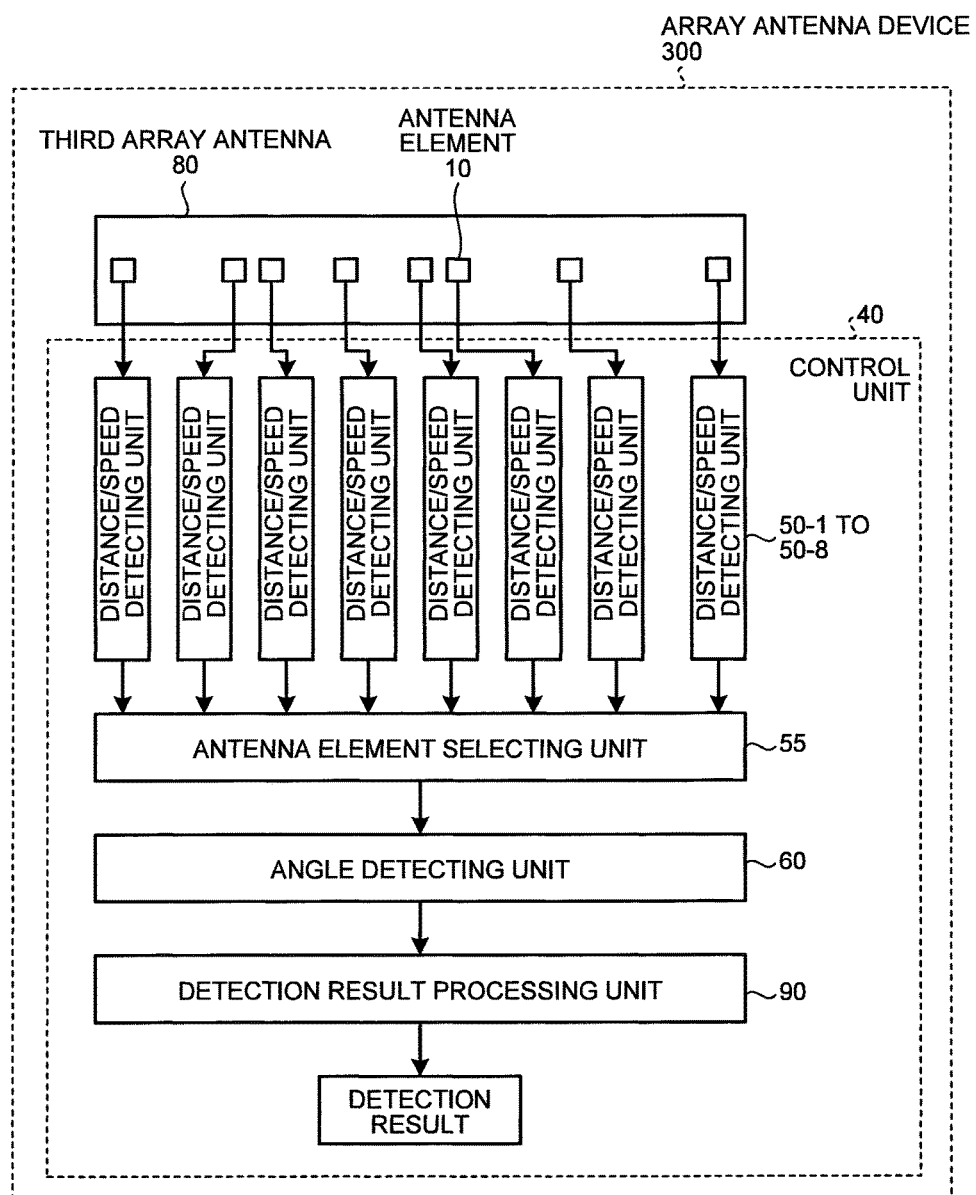
FIG. 9 is a diagram illustrating an example of a configuration of an array antenna device according to a third embodiment.
Figure 12:
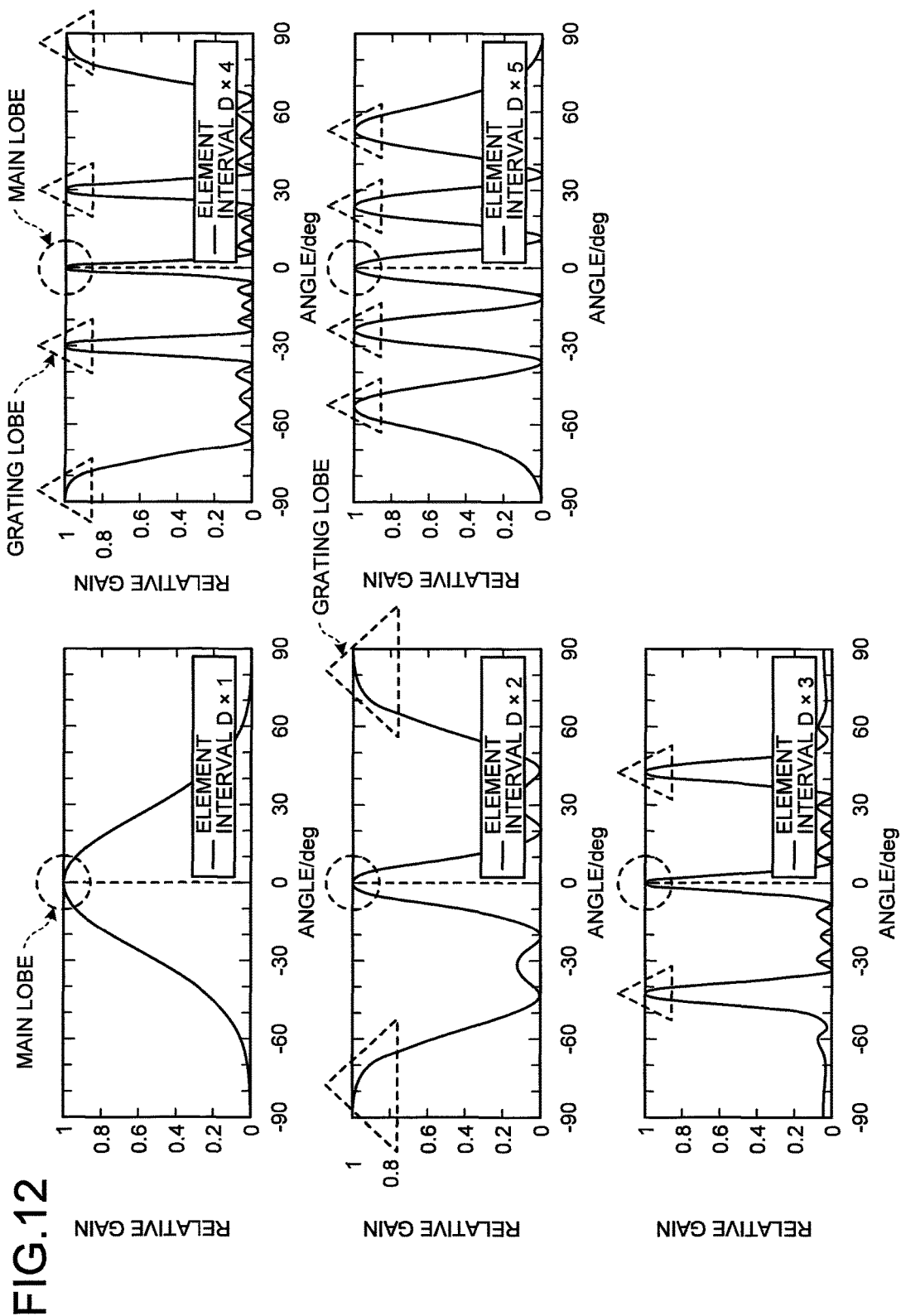
FIG. 12 is a diagram illustrating an example of directivity patterns at respective antenna element intervals according to the third embodiment.
Figure 13:
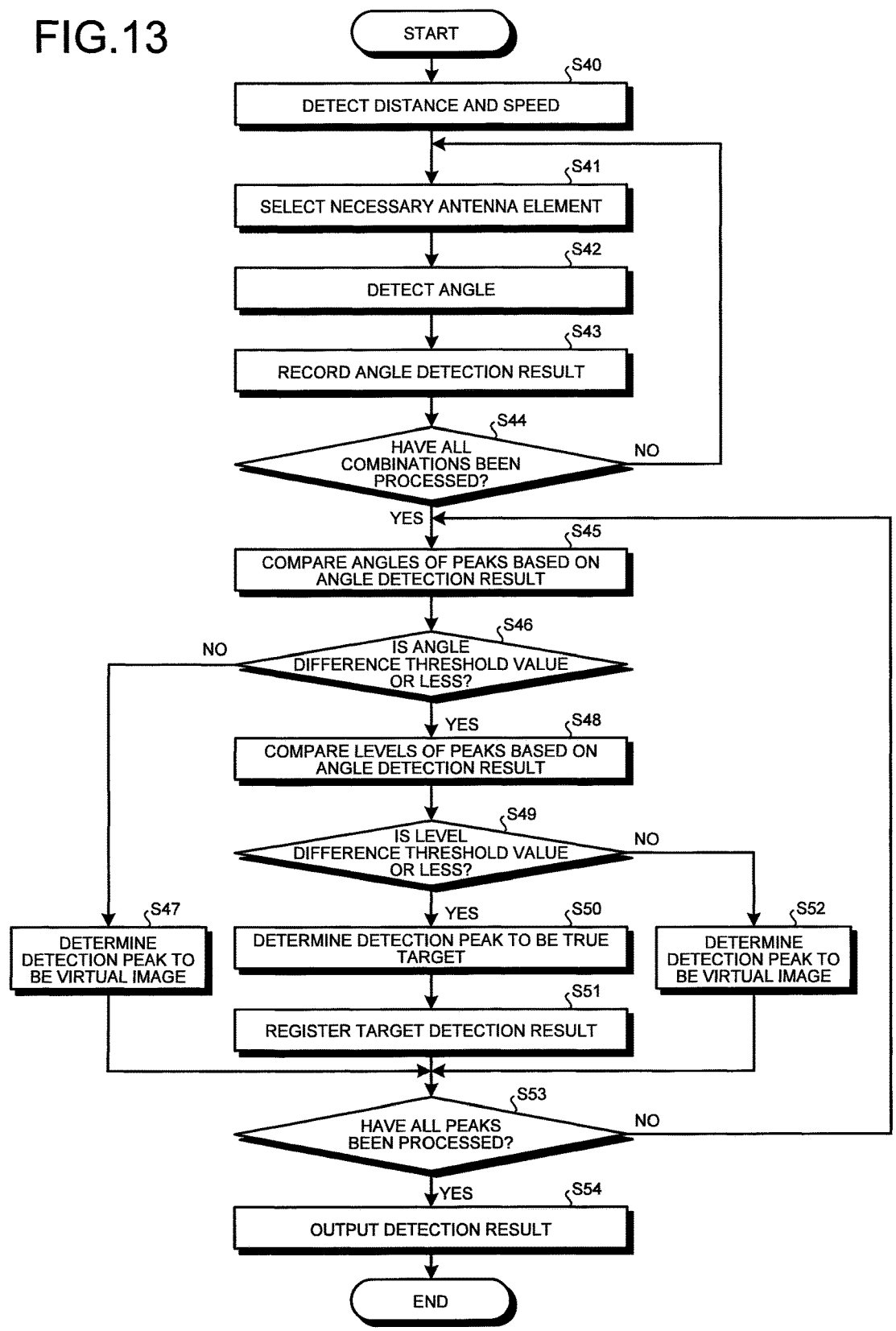
FIG. 13 is a flowchart illustrating an example of a process according to the third embodiment.

A third embodiment will be described with reference to FIGS. 9 to 13. FIG. 9 is a diagram illustrating an example of a configuration of an array antenna device according to the third embodiment. FIG. 9 is also is a diagram illustrating an example of a configuration of the array antenna device according to the second embodiment. FIG. 10 is a diagram illustrating an example of an arrangement of antenna elements according to the third embodiment. FIG. 11 is a diagram illustrating an example of selectable antenna element intervals according to the third embodiment. FIG. 12 is a diagram illustrating an example of directivity patterns at respective antenna element intervals according to the third embodiment. FIG. 13 is a flowchart illustrating an example of a process according to the third embodiment.

An array antenna device 300 according to the third embodiment includes the third array antenna 80 illustrated in FIG. 8 as illustrated in FIG. 9. The third array antenna 80 is an array antenna in which antenna elements 10 are arranged at positions of K1 times and K2 times of the minimum antenna element interval D, and the antenna elements 10 are arranged at a straight line using the antenna element 10 at the left end of the third array antenna 80 as a common antenna element. K1 and K2 are relatively prime positive integers of 2 or larger.

In FIG. 9, the array antenna device 300 according to the third embodiment includes the third array antenna 80 and a control unit 40. In the third embodiment, the control unit 40 includes distance/speed detecting units 50-1 to 50-8 which are equal in number to the number of antenna elements 10 of the third array antenna 80, an antenna element selecting unit 55, an angle detecting unit 60, and a detection result processing unit 90. The respective processing units of the control unit 40 will be described below.

In the control unit 40, each of the distance/speed detecting units 50-1 to 50-8 is a distance/speed detecting unit that detects a distance and a speed of the target based on signals received through the antenna elements 10 of the third array antenna 80. In the third embodiment, the distance/speed detecting units 50-1 to 50-8 receives the signals of the corresponding antenna elements 10 of the third array antenna 80, and performs the detection process. Specifically, the distance/speed detecting unit 50-1 receives the signal of the antenna element 10 at the left end among the antenna elements 10 of the third array antenna 80, and performs the detection process. The distance/speed detecting unit 50-2 selects the signal of the second antenna element 10 from the left end, and performs the detection process. The distance/speed detecting unit 50-3 receives the signal of the third antenna element 10 from the left end, and performs the detection process. Similarly, the distance/speed detecting units 50-4 to 50-8 select the signal of the fourth to eighth antenna elements 10 from the left end and perform the detection process. Each of the distance/speed detecting units 50-1 to 50-8 output the distance and the speed of the detection result of the target to the antenna element selecting unit 55.

The antenna element selecting unit 55 is an antenna element selecting unit that selects a necessary antenna element 10. Specifically, the antenna element selecting unit 55 holds the detection results of the antenna elements output from the distance/speed detecting units 50-1 to 50-8, and selects a combination of the antenna elements to be used for the detection process by the angle detecting unit 60 at the next stage.

Here, the antenna element interval selected by the antenna element selecting unit 55 and an example of an arrangement thereof will be described with reference to FIG. 10. FIG. 10 illustrates examples of an antenna element arrangement when K1=3, and K2=4, an antenna element arrangement when K1=3, and K2=5, and an antenna element arrangement when K1=4, and K2=5 as first to third examples.

In the first example, an array antenna configured with five antenna elements arranged at intervals of D×4 and five antenna elements arranged at intervals of D×3 is illustrated. In the first example, the antenna element at the left end and the second antenna element from the right end among the antenna elements are served as the common antenna elements. In the second example, an array antenna configured with six antenna elements arranged at intervals of D×5 and six antenna elements arranged at intervals of D×3 is illustrated. In the second example, the second antenna element from the left end and the second antenna element from the right end among the antenna elements are served as the common antenna elements. In the third example, an array antenna configured with six antenna elements arranged at intervals of D×5 and six antenna elements arranged at intervals of D×4 is illustrated. In the third example, the antenna element at the left end and the second antenna element from the right end among the antenna elements are served as the common antenna elements.

For example, the antenna element selecting unit 55 appropriately selects a combination of antenna elements used for the detection process by the angle detecting unit 60 from the first to third examples illustrated in FIG. 10. The combination of antenna elements is not limited to the examples illustrated in FIG. 10, and a combination of antenna elements can be selected from a plurality of antenna element arrangement examples in addition to the examples illustrated in FIG. 10. In FIG. 10, the example in which the number of antenna elements having the intervals of D×K1 is equal to the number of antenna elements having the intervals of D×K2 is illustrated, but the number of antenna elements having the intervals of D×K1 may be different from the number of antenna elements having the intervals of D×K2.

Furthermore, in the configuration according to the third embodiment, a combination of antenna elements having intervals rather than the intervals of D×K1 and the intervals of D×K2 may be used as illustrated in FIG. 11. In FIG. 11, intervals at which integers (1, 2, 3, 4, and 5 in FIG. 11) having an integral multiple of the minimum antenna element interval D as the antenna element interval do not have a relatively prime relation are omitted. FIG. 11 illustrates that a combination of D×2, D×1, and D×5 can be selected as the antenna element intervals in addition to a combination of D×4 and D×3 when the combination of the first example of FIG. 10 (the case in which K1=3, and K2=4) is selected.

Referring back to FIG. 9, the description of the configuration of the third embodiment is continued. The angle detecting unit 60 is an angle detecting unit that detects the angle of the target using the detection result of the distance and the speed which is detected through the distance/speed detecting unit 50 and corresponds to the antenna elements selected by the antenna element selecting unit 55. The detection result includes the detection result by the grating lobe in addition to the detection result by the main lobe. The angle detecting unit 60 outputs the detection result of the angle of the target to the detection result processing unit 90.

Here, the directivity pattern will be described with reference to FIG. 12. FIG. 12 illustrates an example of directivity patterns (array factors) at the respective antenna element intervals (D×1 to D×5) when D=0.5λ. All the directivity patterns are directivity patterns when the main lobe is directed in the 0° direction. When the antenna element interval is D×2, the grating lobe occurs near +90° and −90°. When the antenna element interval is D×3, the grating lobe occurs near +42° and −42°. When the antenna element interval is D×4, the grating lobe occurs near +30° and −30° and near +90° and −90°. When the antenna element interval is D×5, the grating lobe occurs near +23° and −23° and near +52° and −52°.

Referring back to FIG. 9, the description of the configuration of the third embodiment is continued. The detection result processing unit 90 is a detection result processing unit that compares the detection results which are detected by the angle detecting unit 60 and correspond to a combination of antenna elements selected by the antenna element selecting unit 55, removes the erroneous detection caused by the grating lobe, and then outputs the detection result.

An example of a process performed by the detection result processing unit 90 will be described under the assumption that the directivity patterns of FIG. 12 are the detection results when the target exist in the 0° direction.

For example, when the antenna element selecting unit 55 selects the combination of D×3 and D×4 (in the case of the first example of FIG. 10), as a result of comparing both angle detection results by the detection result processing unit 90, as illustrated in FIG. 12, for peaks near +42° and −42° detected in the case of D×3, peaks near +90° and −90°, and peaks near +30° and −30° detected in the case of D×4, the level difference of received signal strength is a threshold value or less (level difference≤threshold value), and the angle difference between the detection angles is larger than a threshold value (angle difference>threshold value), and thus the peaks are determined to be the detection result by the grating lobe. On the other hand, for peaks near +0° and −0° detected in the case of D×3, and peaks near +0° and −0° detected in the case of D×4, the level difference of received signal strength is a threshold value or less (level difference≤threshold value), and the angle difference between the detection angles is also a threshold value or less (angle difference≤threshold value), and thus the peaks are determined to be the detection result by the main lobe.

Further, when the antenna element selecting unit 55 selects the combination of D×3 and D×5 (in the case of the second example of FIG. 10), as a result of comparing both angle detection results by the detection result processing unit 90, as illustrated in FIG. 12, for peaks near +42° and −42° detected in the case of D×3, and peaks near +52° and −52° and peaks near +23° and −23° detected in the case of D×5, the level difference of received signal strength is a threshold value or less (level difference≤threshold value), and the angle difference between the detection angles is larger than a threshold value (angle difference>threshold value), and thus the peaks are determined to be the detection result by the grating lobe. On the other hand, for peaks near +0° and −0° detected in the case of D×3 and peaks near +0° and −0° detected in the case of D×5, the level difference of received signal strength is a threshold value or less (level difference≤threshold value), and the angle difference between the detection angles is also a threshold value or less (angle difference≤threshold value), and thus the peaks are determined to be the detection result by the main lobe.

Further, when the antenna element selecting unit 55 selects the combination of D×4 and D×5 (in the case of the third example of FIG. 10), as a result of comparing both angle detection results by the detection result processing unit 90, as illustrated in FIG. 12, for peaks near +90° and −90° and peaks near +30° and −30° detected in the case of D×4 and peaks near +52° and −52° and peaks near +23° and −23° detected in the case of D×5, the level difference of received signal strength is a threshold value or less (level difference≤threshold value), and the angle difference between the detection angles is larger than a threshold value (angle difference>threshold value), and thus the peaks are determined to be the detection result by the grating lobe. On the other hand, for peaks near +0° and −0° detected in the case of D×4 and peaks near +0° and −0° detected in the case of D×5, the level difference of received signal strength is a threshold value or less (level difference≤threshold value), and the angle difference between the detection angles is also a threshold value or less (angle difference≤threshold value), and thus the peaks are determined to be the detection result by the main lobe.

In the present embodiment, the threshold value of the angle difference used when the detection result processing unit 90 compares both angle detection results is assumed to be appropriately set to a value used for determining the angle difference between the detection angles of the peaks for each combination selected by the antenna element selecting unit 55.

As illustrated in FIG. 12, when the antenna element intervals are different, the angles at which the grating lobe appear are different, and thus it is possible to remove the erroneous detection caused by the grating lobe by comparing the detection results by the directivity patterns obtained from a plurality of combinations of antenna element intervals as in the present embodiment.

An example of a detection result output process performed by the array antenna device 300 having the above-described configuration according to the third embodiment will be described with reference to FIG. 13.

As illustrated in FIG. 13, each of the distance/speed detecting units 50-1 to 50-8 detects the distance and the speed of the target based on the signals received by the antenna elements 10 of the third array antenna 80 (step S40).

The antenna element selecting unit 55 holds the detection results of the antenna elements output from the distance/speed detecting units 50-1 to 50-8 in step S40, and then selects a combination of the antenna elements to be used for the detection process by the angle detecting unit 60 in step S42 (step S41).

The angle detecting unit 60 detects the angle of the target using the detection result of the distance and the speed which is detected through the distance/speed detecting unit 50 and corresponds to the antenna elements selected by the antenna element selecting unit 55 in step S41 (step S42).

The angle detecting unit 60 records the angle detection result detected in step S42 (step S43). The detection result includes the detection result by the grating lobe in addition to the detection result by the main lobe.

After the angle detecting unit 60 records the angle detection result in step S43, the antenna element selecting unit 55 determines whether or not all combinations have been processed in order to process each combination of antenna elements (step S44).

Here, when it is determined that there is any one combination that is not processed in step S44 (No in step S44), the antenna element selecting unit 55 causes the process to return to step S41, and repeats the process of steps S41 to S43 for each combination of antenna elements.

Then, when all combinations are determined to have been processed in step S44 as a result of repeatedly performing the process of steps S41 to S43 on all combinations (Yes in step S44), the antenna element selecting unit 55 causes the process to proceed to step S45.

The detection result processing unit 90 compares the angles of the peaks included in the angle detection results based on the angle detection results recorded for each combination in step S43 (step S45).

The detection result processing unit 90 determines whether or not the angle difference of the peaks is a threshold value or less (angle difference≤threshold value) based on a result of comparing the angles of the peaks obtained in the process of step S45 (step S46).

The detection result processing unit 90 specifies the peak of the detection angle in one detection result which is closest to the reference peak in another detection result, and determines the reference peak to be the virtual image when the angle difference of the peaks is determined to be larger than a threshold value (angle difference>threshold value) in step S46 (No in step S46) (step S47).

When the peak is determined to be the virtual image in step S47, the detection result processing unit 90 removes the peak determined to be the virtual image without registering the peak as the detection result, and then determines whether or not all peaks have been processed in order to process each peak (step S53). In step S53, the detection result processing unit 90 determines whether or not all peaks of the first detection result and the second detection result have been processed.

Here, when it is determined that there is any one peak that has not been processed in step S53 (No in step S53), the detection result processing unit 90 causes the process to return to step S45, and the process of steps S45 to S52 performed by the detection result processing unit 90 is repeated for each peak.

The process returns to step S45, and the description of the process according to the third embodiment is continued. The detection result processing unit 90 compares angels of other peaks that do not undergo the process of steps S45 to S52 based on the angle detection results recorded for each combination in step S43 (step S45). Then, the detection result processing unit 90 determines whether or not the angle difference of the peaks is a threshold value or less (angle difference≤threshold value) based on a result of comparing the angles of the peaks obtained in the process of step S45 (step S46).

Then, the detection result processing unit 90 specifies the peak of the detection angle in one detection result which is closest to the reference peak in another detection result, and compares the levels of the peaks when the angle difference of the peaks is determined to be a threshold value or less (angle difference≤threshold value) in step S46 (Yes in step S46) (step S48). Then, the detection result processing unit 90 determines whether or not the level difference between the peaks is a threshold value or less (level difference≤threshold value) based on a result of comparing the levels of the peaks obtained in the process of step S48 (step S49).

The detection result processing unit 90 specifies the peak of the detection angle in one detection result which is closest to the reference peak in another detection result, and determines the reference peak to be the true target when the level difference between the peaks is determined to be a threshold value or less (level difference≤threshold value) in step S49 (Yes in step S49) (step S50).

The detection result processing unit 90 registers the detection result of the target determined to be the detection result by the main lobe in step S50 (step S51).

The detection result processing unit 90 determines whether or not all peaks have been processed (step S53). In step S53, the detection result processing unit 90 determines whether or not all the peaks of the first detection result and the second detection result have been processed. Here, when it is determined that there is any one peak that has not been processed in step S53 (No in step S53), the detection result processing unit 90 causes the process to return to step S45, and the process of steps S45 to S52 performed by the detection result processing unit 90 is repeated for each peak.

The process returns to step S45, and the description of the process according to the third embodiment is continued. The detection result processing unit 90 compares angels of other peaks that do not undergo the process of steps S45 to step S52 based on the detection results recorded for each combination in step S43 (step S45). Then, the detection result processing unit 90 determines whether or not the angle difference of the peaks is a threshold value or less (angle difference≤threshold value) based on a result of comparing the angles of the peaks obtained in the process of step S45 (step S46).

Then, the detection result processing unit 90 specifies the peak of the detection angle in one detection result which is closest to the reference peak in another detection result, and compares the levels of the peaks when the angle difference of the peaks is determined to be a threshold value or less (angle difference≤threshold value) in step S46 (Yes in step S46) (step S48). Then, the detection result processing unit 90 determines whether or not the level difference between the peaks is a threshold value or less (level difference≤threshold value) based on a result of comparing the levels of the peaks obtained in the process of step S48 (step S49).

The detection result processing unit 90 specifies the peak of the detection angle in one detection result which is closest to the reference peak in another detection result, and determines the reference peak to be the virtual image when the level difference between the peaks is determined to be larger than a threshold value (the level difference>threshold value) in step S49 (No in step S49) (step S52).

When the peak is determined to be the virtual image in step S52, the detection result processing unit 90 removes the peak determined to be the virtual image without registering the peak as the detection result, and then determines whether or not all peaks have been processed in order to process each peak (step S53). In step S53, the detection result processing unit 90 determines whether or not all peaks of the first detection result and the second detection result have been processed.

Then, the detection result processing unit 90 outputs the detection result by the main lobe in a state in which the erroneous detection caused by the grating lobe is removed based on the detection result of the target registered in step S51 when all peaks are determined to have been processed in step S53 (Yes in step S53), that is, when all peaks of the first detection result and the second detection result are determined to have been processed as a result of repeatedly performing the processes of steps S45 to S52 on all peaks (step S54). Thereafter, the process illustrated in FIG. 13 ends.

As described above, according to the array antenna device 300 of the third embodiment, it is possible hold the detection results of the antenna elements, repeatedly perform the angle detection while changing the combination to be used, and remove the detection result by the grating lobe using the result. Further, it is possible to widely open both sides of the antenna elements arranged at the minimum antenna element intervals D and place the power supply unit for the antenna elements at the left and right of the antenna elements arranged at the minimum antenna element intervals D, and it is easy to install the power supply circuit even when the minimum antenna element interval D is set to be small.

In the third embodiment, the example in which the processes of steps S41 to S43 is repeatedly performed for each combination until all combinations of antenna elements are processed in step S44 of FIG. 13 has been described, but the present invention is not limited thereto. In the third embodiment, the process of steps S41 to S43 may be repeatedly performed on a combination of antenna elements selected in step S41. For example, when only the combination of D×4 and D×5 (the third example of FIG. 10) and the combination of D×3 and D×5 (the second example of FIG. 10) are selected in step S41, the processes of steps S41 to S43 may be repeatedly performed on the two combinations.

As described above, according to the array antenna devices 100 to 300 of the first to third embodiments equipped with the array antenna having the arrangement structure of the present embodiment, it is possible to solve the problem in the technique of removing the erroneous detection caused by the grating lobe according to the related art as will be described later.

For example, Patent Literature 1 discloses an array antenna in which an array interval of a transmitting antenna and an array interval of a receiving antenna are set to be a ratio of relatively prime integers, and the grating lobe is suppressed by the product of transmitting and receiving antenna patterns with a relation in which the grating lobes do not overlap each other. In the array antenna device disclosed in Patent Literature 1, the antenna element interval is set so that the grating lobe occurs at the null position of the element antenna pattern. However, the technique disclosed in Patent Literature 1 is not on the assumption that beam scanning is performed. For this reason, if the beam scanning is performed, the null position of the element antenna pattern is not identical to the positions of the grating lobes of the transmitting and receiving antennas, and thus there is a problem in that some grating lobes are not likely to be suppressed but remain in the detection angle range.

On the other hand, the array antenna device of the present embodiment includes the array antenna device arranged to include the two types of array antenna element arrangements. Here, the antenna element intervals of the two types of array antenna element arrangements are an integral multiple of the minimum antenna element interval serving as the antenna element interval set so that the grating lobe does not occur in a predetermined detection angle range (the beam scanning range) indicated in Formula 1, and the integers are positive integers of 2 or larger having a relatively prime relation. Accordingly, according to the array antenna device of the present embodiment, the erroneous detection caused by the grating lobe can be removed in a predetermined detection angle range (−α to α) (the beam scanning range). In other words, it is possible to compare the detection results by the two types of array antennas and determine the detection peak by the grating lobe in the beam scanning range. As described above, when the beam scanning is performed in the array antenna, the erroneous detection caused by the grating lobe can be removed.

In addition, an array antenna device in which antenna elements of a receiving antenna are arranged at small intervals at which the grating lobe does not occur in a detection angle range is considered, but there is a problem in that as the interval of the antenna element arrangement that is set decreases, the size of the entire antenna decreases, and the width of a formed beam increases, that is, the angular resolution gets worse. Further, in this array antenna device, there is a problem in that since the antenna elements are arranged at small intervals, and it is difficult to arrange a power supply port between the antenna elements. For example, when the beam scanning of ±90° is performed, it is necessary to set the antenna element interval to be 0.5λ or less, but when the power supply is performed through a waveguide, the horizontal width of the waveguide is already 0.5 or more, and thus it is difficult to arrange the waveguide between the antenna elements.

The array antenna device with the array antenna having the arrangement structure according to the present embodiment has the configuration which the antenna element interval is large, and wide-angle beam scanning can be performed. Specifically, in the present embodiment, the target detection process is performed at the respective antenna element intervals using the array antenna that can be broken down into the two types of array antenna element arrangements that differ in the antenna element interval, the ghost by the grating lobe is determined and removed by comparing the results, and the wide-angle beam scanning is performed. Accordingly, the element interval larger than the minimum element interval can be secured at a plurality of positions of the array antenna, and the waveguide can be arranged between the antenna elements. Further, when the array antenna elements have a large interval, the width of the beam is reduced. Thus, the angular resolution is improved to be higher than the array antenna in which the same number of elements are arranged at the minimum element interval.

REFERENCE SIGNS LIST

10 ANTENNA ELEMENT
20 FIRST ARRAY ANTENNA
30 SECOND ARRAY ANTENNA
40 CONTROL UNIT
50 DISTANCE/SPEED DETECTING UNIT
55 ANTENNA ELEMENT SELECTING UNIT
60 ANGLE DETECTING UNIT
70 COMPARISON DETECTING UNIT
80 THIRD ARRAY ANTENNA
90 DETECTION RESULT PROCESSING UNIT
100, 200, 300 ARRAY ANTENNA DEVICE

The invention claimed is:

1. An array antenna device including a plurality of antenna elements arranged to include a first antenna element arrangement in which the antenna elements are arranged at element intervals having predetermined periodicity and a second antenna element arrangement in which the antenna elements are arranged at element intervals having predetermined periodicity different from the periodicity in the first antenna element arrangement, the array antenna device comprising:
 a control unit configured to remove erroneous detection caused by a grating lobe based on a comparison of a detection result by an array antenna of the first antenna element arrangement and a detection result by an array antenna of the second antenna element arrangement,
wherein a first element interval serving as an antenna element interval of the first antenna element arrangement and a second element interval serving as an antenna element interval of the second antenna element arrangement are intervals of an integral multiple of a minimum antenna element interval set as an antenna element interval satisfying Formula 1:

$$0 < D < (0.5\lambda/\sin\alpha) \qquad \text{(Formula 1)}$$

in Formula 1, D indicates the minimum antenna element interval, $\alpha$ indicates a predetermined maximum detection angle, and $\lambda$ indicates a wavelength of a radio wave, and
a first integer serving as an integer used for setting the first element interval to be the integral multiple of the minimum antenna element interval and a second integer serving as an integer used for setting the second element interval to be the integral multiple of the minimum antenna element interval are satisfied to be positive integers of 2 or larger having a relatively prime relation.

2. The array antenna device according to claim 1, wherein the antenna elements corresponding to the first antenna element arrangement and the antenna elements corresponding to the second antenna element arrangement are arranged such that an array antenna of the first antenna element arrangement and an array antenna of the second antenna element arrangement are arranged in parallel.

3. The array antenna device according to claim 1, wherein the antenna elements corresponding to the first antenna element arrangement and the antenna elements corresponding to the second antenna element arrangement are arranged such that the first antenna element arrangement and the second antenna element arrangement are combined and arranged on a straight line in series in a state in which a position of at least one of the antenna elements of the first antenna element arrangement overlaps with a position of at least one of the antenna elements of the second antenna element arrangement.

* * * * *